(12) United States Patent
Wodrich

(10) Patent No.: US 10,571,562 B2
(45) Date of Patent: Feb. 25, 2020

(54) VEHICLE SHORT RANGE SENSING SYSTEM USING RF SENSORS

(71) Applicant: MAGNA ELECTRONICS INC., Auburn Hills, MI (US)

(72) Inventor: Helmut A. Wodrich, Clarkston, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 398 days.

(21) Appl. No.: 15/467,247

(22) Filed: Mar. 23, 2017

(65) Prior Publication Data

US 2017/0276788 A1    Sep. 28, 2017

Related U.S. Application Data

(60) Provisional application No. 62/313,279, filed on Mar. 25, 2016.

(51) Int. Cl.
*G01S 13/04* (2006.01)
*G01S 13/931* (2020.01)
*G01S 13/93* (2020.01)

(52) U.S. Cl.
CPC ..... *G01S 13/931* (2013.01); *G01S 2013/9375* (2013.01); *G01S 2013/9378* (2013.01); *G01S 2013/9385* (2013.01); *G01S 2013/9389* (2013.01)

(58) Field of Classification Search
CPC .... G01S 13/867; G01S 13/878; G01S 13/931; G01S 15/878; G01S 2013/9375; G01S 2013/9378; G01S 2013/9385; G01S 2013/9389

USPC .......................................................... 342/70
See application file for complete search history.

(56) References Cited

U.S. PATENT DOCUMENTS

| | | |
|---|---|---|
| 5,949,331 A | 9/1999 | Schofield et al. |
| 6,587,186 B2 | 7/2003 | Bamji et al. |
| 6,642,908 B2 * | 11/2003 | Pleva ................. B60K 31/0008 343/876 |
| 6,674,895 B2 | 1/2004 | Rafii et al. |
| 6,678,039 B2 | 1/2004 | Charbon |
| 6,690,354 B2 | 2/2004 | Sze |
| 6,710,770 B2 | 3/2004 | Tomasi et al. |
| 6,825,455 B1 | 11/2004 | Schwarte |
| 6,876,775 B2 | 4/2005 | Torunoglu |

(Continued)

FOREIGN PATENT DOCUMENTS

WO     2011090484 A1    7/2011

*Primary Examiner* — Timothy A Brainard
(74) *Attorney, Agent, or Firm* — Honigman LLP

(57) ABSTRACT

A sensing system for a vehicle includes a plurality of radio frequency (RF) sensor units disposed at the vehicle so as to have respective fields of sensing exterior of the vehicle. Each RF sensor unit includes a system on chip unit comprising a plurality of transmitting antennae and a plurality of receiving antennae, with each transmitting antenna transmitting RF signals and each receiving antenna receiving RF signals transmitted by each transmitting antenna to provide a respective field of sensing of each of the RF sensor units. Outputs of the RF sensor units are communicated to a control and, responsive to the outputs of the RF sensor units, the control determines the presence of one or more objects exterior the vehicle and within the field of sensing of at least one of the RF sensor units.

20 Claims, 7 Drawing Sheets

SYSTEM ARCHITECTURE
(MULTIPLE SENSORS VIA ETHERNET)
(360° SENSING)

(56) References Cited

U.S. PATENT DOCUMENTS

| | | | |
|---|---|---|---|
| 6,906,793 | B2 | 6/2005 | Bamji et al. |
| 6,919,549 | B2 | 7/2005 | Bamji et al. |
| 7,053,357 | B2 | 5/2006 | Schwarte |
| 7,157,685 | B2 | 1/2007 | Bamji et al. |
| 7,176,438 | B2 | 2/2007 | Bamji et al. |
| 7,203,356 | B2 | 4/2007 | Gokturk et al. |
| 7,212,663 | B2 | 5/2007 | Tomasi |
| 7,283,213 | B2 | 10/2007 | O'Connor et al. |
| 7,310,431 | B2 | 12/2007 | Gokturk et al. |
| 7,321,111 | B2 | 1/2008 | Bamji et al. |
| 7,340,077 | B2 | 3/2008 | Gokturk et al. |
| 7,352,454 | B2 | 4/2008 | Bamji et al. |
| 7,375,803 | B1 | 5/2008 | Bamji |
| 7,379,100 | B2 | 5/2008 | Gokturk et al. |
| 7,379,163 | B2 | 5/2008 | Rafii et al. |
| 7,405,812 | B1 | 7/2008 | Bamji |
| 7,408,627 | B2 | 8/2008 | Bamji et al. |
| 8,013,780 | B2 | 9/2011 | Lynam |
| 8,027,029 | B2 | 9/2011 | Lu et al. |
| 9,575,160 | B1 | 2/2017 | Davis et al. |
| 2009/0021434 | A1* | 1/2009 | Lee ................... H01Q 1/3208 343/703 |
| 2010/0245066 | A1 | 9/2010 | Sarioglu et al. |
| 2016/0023624 | A1* | 1/2016 | Schaaf ................ B60R 19/03 293/117 |
| 2017/0113664 | A1* | 4/2017 | Nix ..................... G07C 5/0891 |
| 2017/0222311 | A1 | 8/2017 | Hess |
| 2017/0254873 | A1 | 9/2017 | Koravadi |
| 2017/0276788 | A1 | 9/2017 | Wodrich |
| 2017/0315231 | A1 | 11/2017 | Wodrich |

\* cited by examiner

HORIZONTAL
ZERO SPL : 112.059
MAX SPL : 112.059
MAX ANGLE : 0
 -6.00 dB : 25.00 - 28.83
VERTICAL
ZERO SPL : 111.946
MAX SPL : 111.946
MAX ANGLE : 0
 -6.00 dB : 24.51 - 31.98

SYSTEM ARCHITECTURE
(MULTIPLE SENSORS VIA ETHERNET)
(360° SENSING)

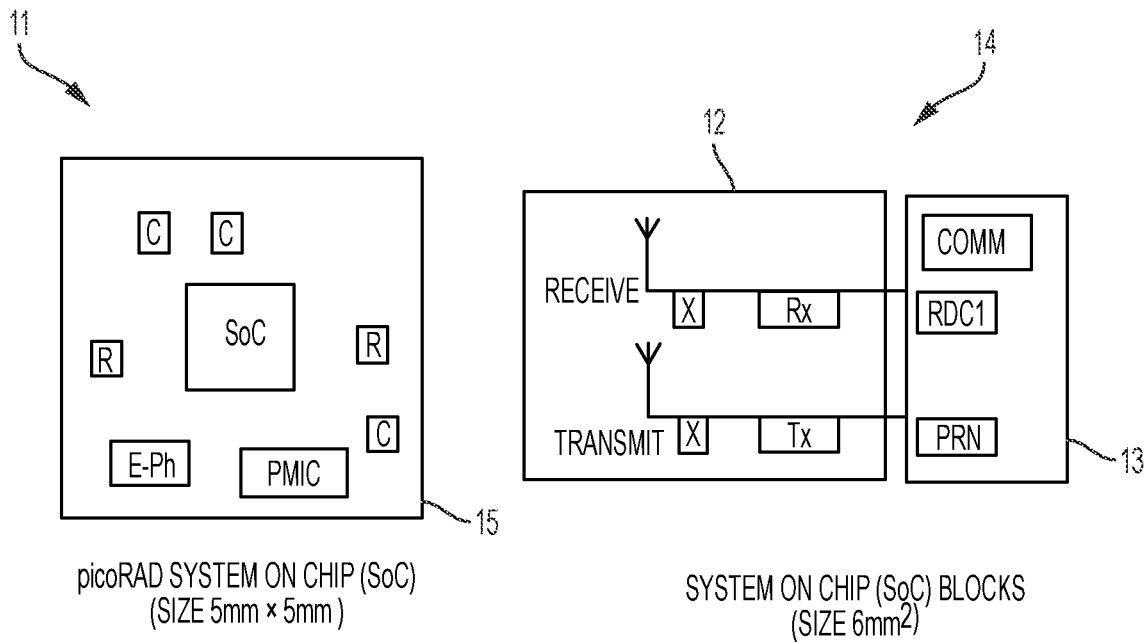
FIG. 10
FIG. 11
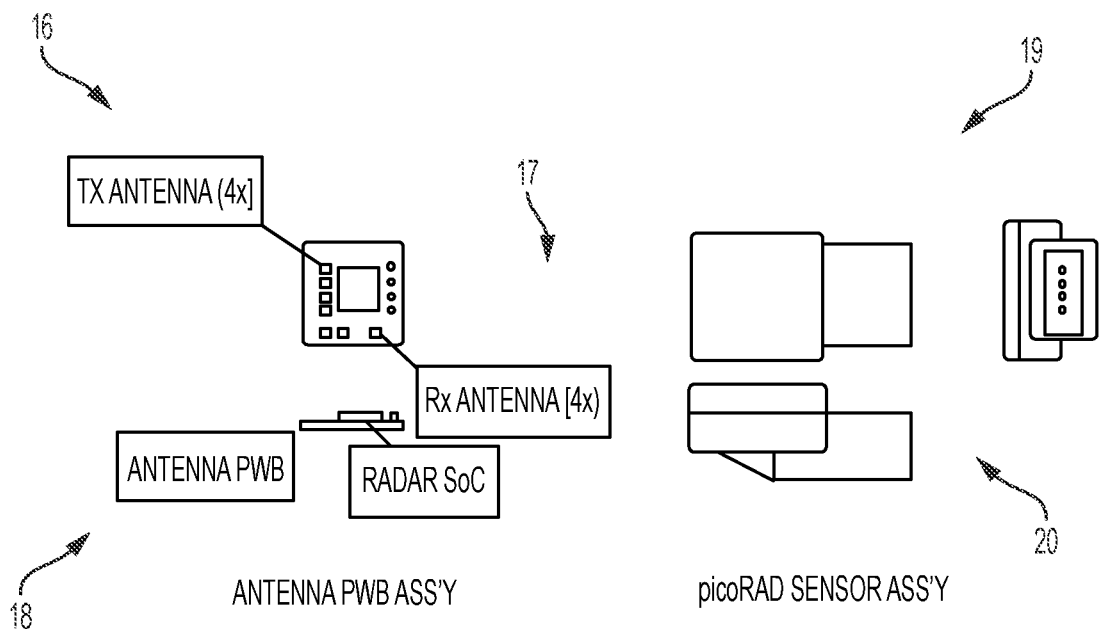
FIG. 12
FIG. 13

VEHICLE SHORT RANGE SENSING SYSTEM USING RF SENSORS

CROSS REFERENCE TO RELATED APPLICATION

The present application claims the filing benefits of U.S. provisional application, Ser. No. 62/313,279, filed Mar. 25, 2016, which is hereby incorporated herein by reference in its entirety.

FIELD OF THE INVENTION

The present invention relates generally to a vehicle sensing system for a vehicle and, more particularly, to a vehicle sensing system that utilizes one or more sensors at a vehicle to provide a field of sensing around the vehicle.

BACKGROUND OF THE INVENTION

Use of imaging sensors or ultrasonic sensors or radar sensors in vehicle sensing systems is common and known. Examples of such known systems are described in U.S. Pat. Nos. 8,013,780 and 5,949,331 and/or U.S. publication No. US-2010-0245066 and/or International Publication No. WO 2011/090484, which are hereby incorporated herein by reference in their entireties.

Ultrasonic sensors have been widely deployed for use in ultrasonic parking systems since the late 1990s. Systems have progressed from provided functions such as rear parking aid, to include automated parking assist, blind spot detection, and the like, adding increasing numbers of sensors per vehicle. Since their introduction, the design and function of ultrasonic systems have become standardized, with periodic incremental improvements occurring to support longer range, improved accuracy and positioning of objects within the desired system field of coverage, and in near range detection. The technology involves transmission cycles where an ultrasonic burst at a defined frequency (35-60 kHz has been typically used) is emitted, followed by a receive cycle. The duration of this transmit-receive cycle is a function of the speed of sound. As a result, longer range detections inherently create longer system update times, where current system update rates are less than five Hz (see FIG. 1), nearly half of the speed of early short range systems.

To support automated functions, higher accuracy of measurement is required. Ultrasonic transmission range calculations are based on the speed of sound through air. This is highly influenced by temperature and humidity, with impacts of approximately five percent for twenty degrees C. and fifty percent relative humidity change from room temperature, fifty percent humidity conditions (see FIG. 2).

The ultrasonic transducer vibrates to generate the burst when transmitting. Before the transducer can receive signals, the transducer's vibration must be damped, so that low energy received signals can be detected. This typically requires 1 ms or greater (see 1 in FIG. 3), causing the system to be unable to detect objects closer than about 17 cm (c=343.37 m/s at twenty degrees C.) from the face of the sensor.

An ultrasonic sensor's typical field of view (FOV) is 120 degrees horizontal and 60 degrees vertical (see 2 and 3, respectively, in FIG. 4). Where used for parking slot measurement, a narrower field of view is desired to improve the accuracy in measurement of potential open parking space, resulting in about a 60 degree horizontal and 60 degree vertical FOV (see 4 and 5, respectively, in FIG. 5).

Objects detected by the ultrasonic system provide a single range measurement, with no angular position available from a single sensor. To more accurately position or determine the location of objects relative to the vehicle, multiple sensors are positioned along the vehicle's bumper fascia so that triangulation techniques can be used by a central Electrical Control Unit (ECU) to calculate the position of objects (see FIG. 6). By using reflections of transmissions sent by each sensor and received by multiple sensors 6 ($1^{st\_E}11$, $1^{st\_E}10$, $1^{st\_E}01$, $1^{st\_E}00$), the accuracy of detection can be improved to ±1 cm. Ultrasonic sensors currently used in practice use multiple sensors, which results in multiple visible transducer faces (approximately 15.5 mm diameter).

SUMMARY OF THE INVENTION

The present invention provides a driver assistance system or sensing system for a vehicle that utilizes one or more RF sensors disposed at the vehicle to sense respective regions exterior of the vehicle, with the RF sensors or sensor units comprising a system on chip unit comprising a plurality of transmitting antennae and a plurality of receiving antennae, with each transmitting antenna transmitting RF signals and each receiving antenna receiving RF signals transmitted by each transmitting antenna to provide a respective field of sensing of each of the RF sensor units. The sensing system includes a control, wherein outputs of the RF sensor units are communicated to the control, and wherein the control, responsive to the outputs of the RF sensor units, determines the presence of one or more objects exterior the vehicle and within the field of sensing of at least one of the RF sensor units.

The system on chip unit may comprise an analog to digital converter, a data processor and a communication device for communicating outputs to the control. The outputs of the RF sensor units may be communicated to the control unit via DSI3, CAN, Ethernet or other suitable communication protocol providing adequate bandwidth for the quantity of data available to be shared.

During operation, the number of transmitting and receiving antenna utilized by the RF sensor unit may be adjustable based on the complexity of the environment surrounding the vehicle. For example, the control may adjust the number of transmitting and receiving antenna utilized by the RF sensor unit responsive to a determination of the complexity of the environment surrounding the vehicle (such as via data processing of outputs of the RF sensor units or via image data processing of image data captured by one or more cameras disposed at the vehicle or the like). For example, when the vehicle is at a relatively simple situation with a totally clear field of view, only one transmitting antenna and one receiving antenna may be used by a particular RF sensor unit, while, as the complexity of the environment increases from the relatively simple situation, the number of transmitting antenna and receiving antenna utilized by the particular RF sensor unit may be increased.

When the quantity of transmitting and receiving antenna utilized by the RF sensor are >1, the sensor may control the timing to achieve true MIMO operation (such as by utilizing aspects of the systems described in U.S. Pat. No. 9,575,160, which is hereby incorporated herein by reference in its entirety) or to operate in any combination of simultaneous or sequential transmit and receive sequences.

These and other objects, advantages, purposes and features of the present invention will become apparent upon review of the following specification in conjunction with the drawings.

BRIEF DESCRIPTION OF THE DRAWINGS

FIGS. 10 and 11 are System on Chip (SoC) block diagrams for the sensing system of the present invention;

FIG. 12 is a schematic of an antenna printed wiring board (PWB) assembly for use in the sensing system of the present invention; and FIG. 13 is a schematic of a sensor assembly for use in the sensing system of the present invention.

DESCRIPTION OF THE PREFERRED EMBODIMENTS

Figure 1:
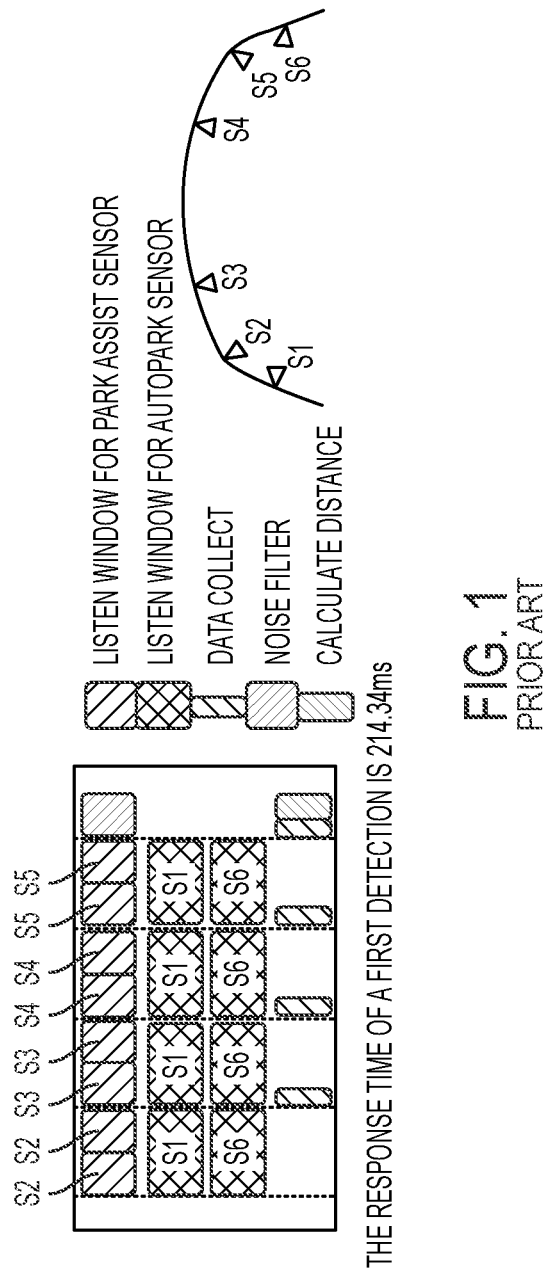
FIG. 1 shows a typical firing sequence for an ultrasonic parking system.
Figure 2:
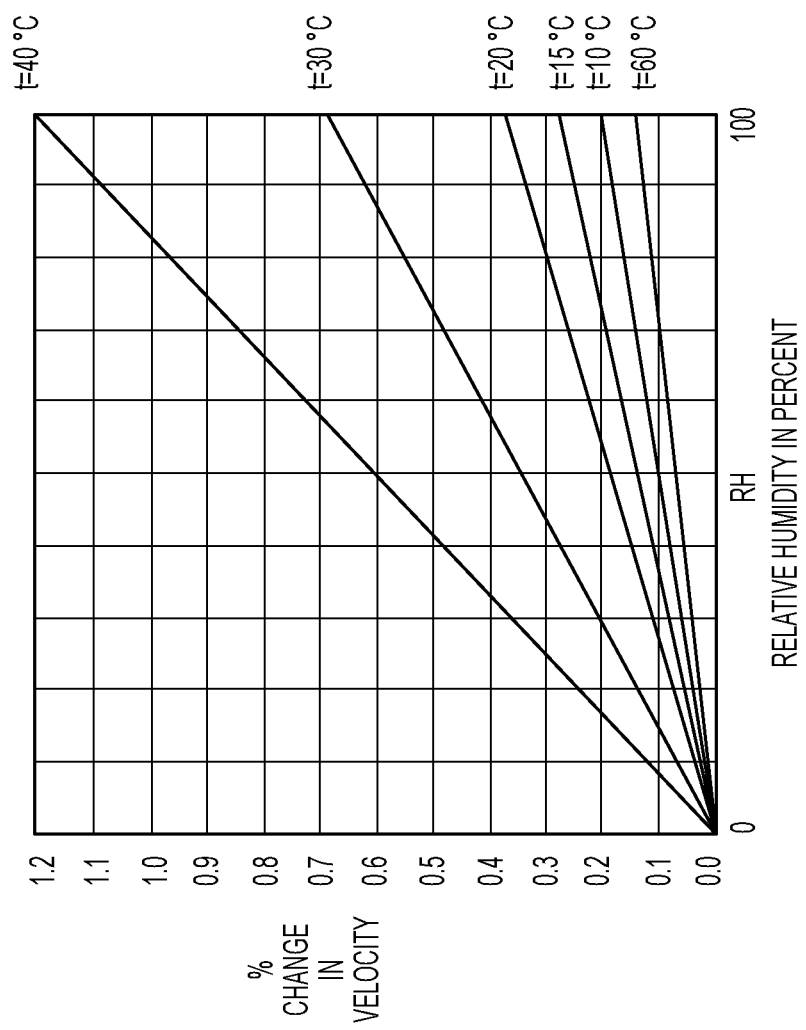
FIG. 2 is a graph showing the effects of temperature and humidity on the speed of sound in air.
Figure 3:
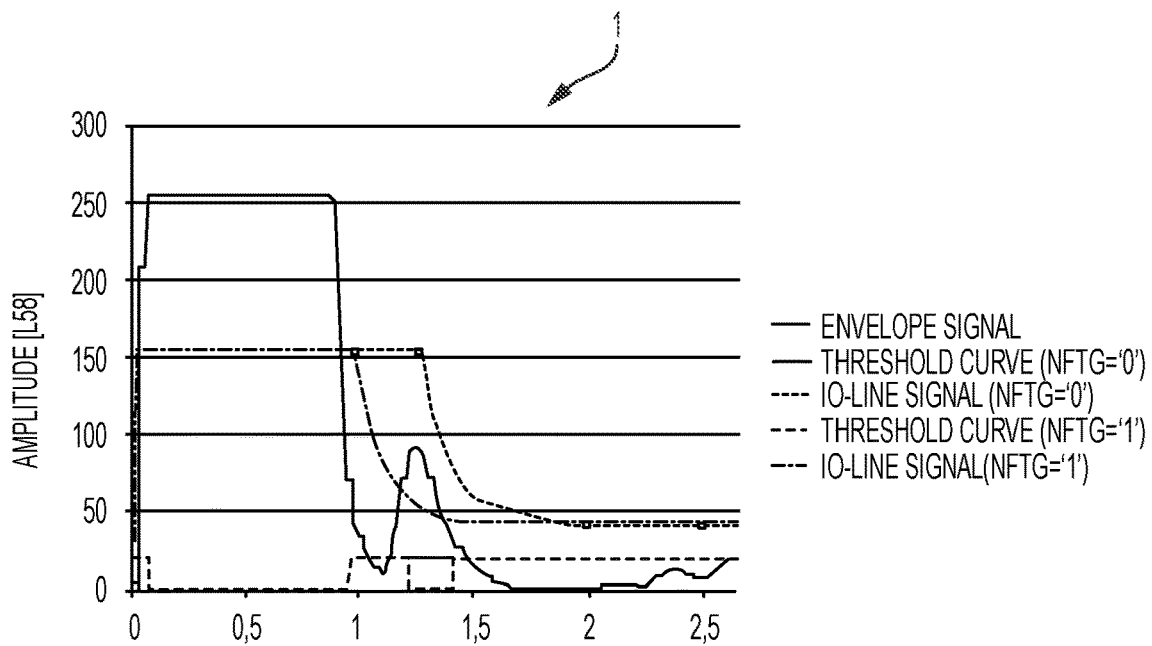
FIG. 3 is a chart showing an ultrasonic sensor settling time.
Figure 4:
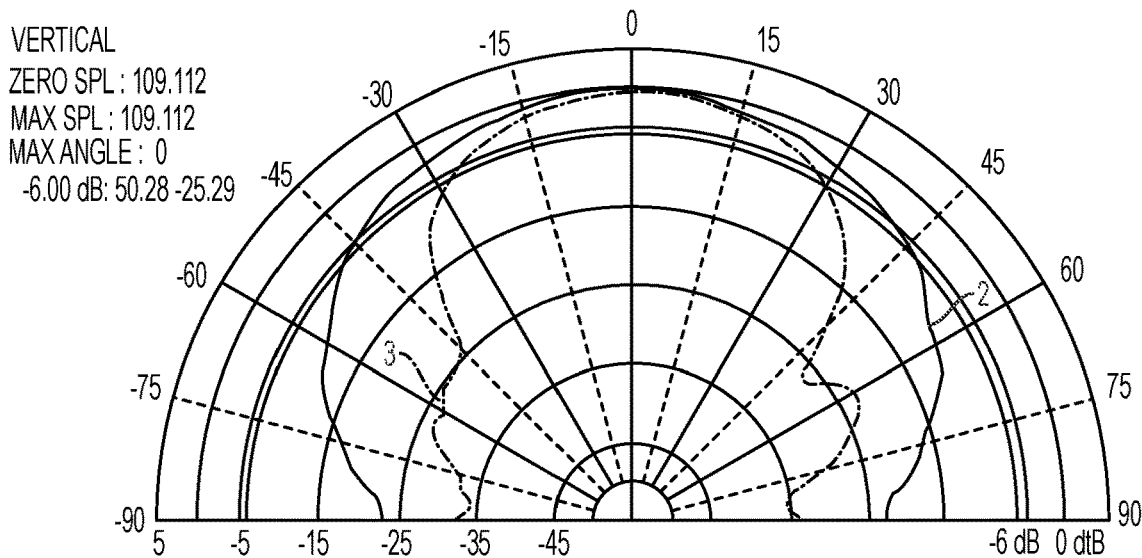
FIG. 4 is a chart showing an ultrasonic parking sensor typical horizontal and vertical field of view.
Figure 5:
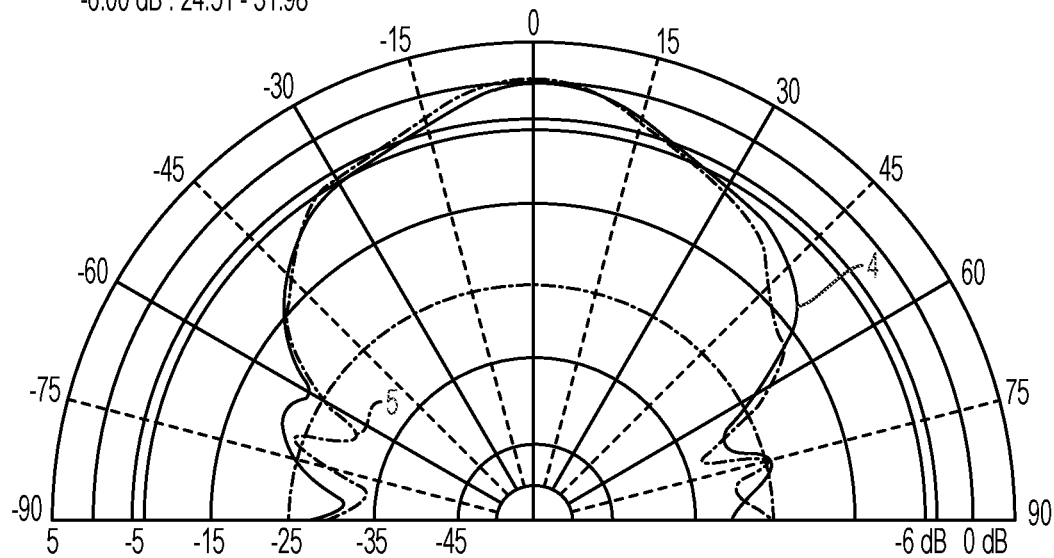
FIG. 5 is a chart showing an ultrasonic parking slot measurement sensor typical horizontal and vertical field of view.
Figure 6:
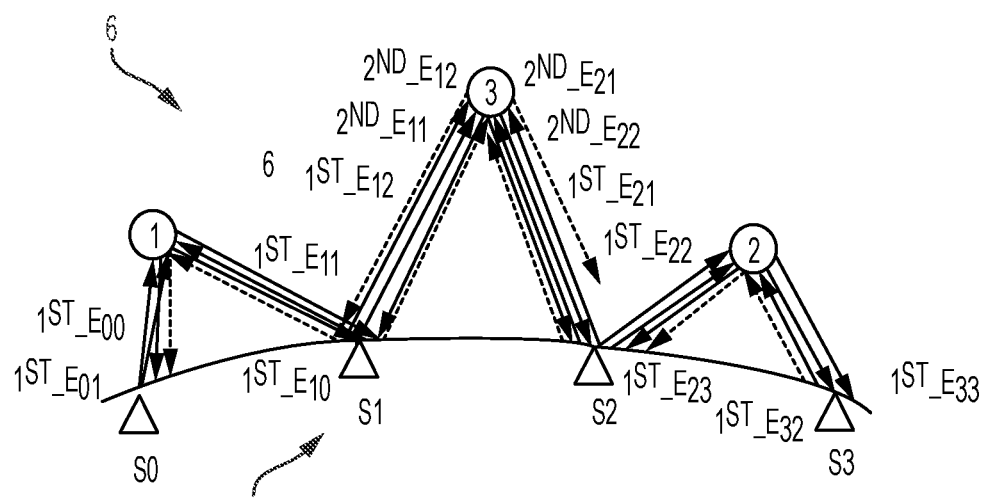
FIG. 6 is a schematic showing triangulation using multiple ultrasonic sensors for improvement of object positional accuracy.

A vehicle sensing system and/or driver assist system and/or object detection system and/or alert system operates to capture sensing data exterior of the vehicle and may process the captured data to detect objects at or near the vehicle and in the predicted path of the vehicle, such as to assist a driver of the vehicle in maneuvering the vehicle in a forward or rearward direction or to assist the driver in parking the vehicle in a parking space. The system includes a processor that is operable to receive sensing data from multiple sensors and provide an output to a control that, responsive to the output, generates an alert or controls an accessory or system of the vehicle, or highlights or overlays an alert on a display screen (that may be displaying video images captured by a rearward viewing camera of the vehicle during a reversing maneuver of the vehicle), or fuses the captured data with data from other sensors.

Sensors are often disposed at the vehicle exterior for sensing exterior of the vehicle. Vehicle manufacturers employ techniques such as painting, black color matching within the front grill of the vehicle and placement into rear lights (red) to improve styling aesthetics. Ultrasonic systems may be capable of transmission through the plastic fascia to eliminate the visible cues deemed undesired by vehicle styling groups. Vehicle manufacturers continue to be interested in technologies that could eliminate visible sensors, yet provide equal function for a similar cost or provide equal function plus incremental capabilities. Future developments include the individual coding of ultrasonic bursts, permitting two or more sensors to transmit simultaneously, to reduce system update rates and provide increased immunity to external noise interference. These enhancements are necessary to support future safety critical functions such as Automatic Emergency Braking.

The system of the present invention uses a plurality of radio frequency (RF) sensors, each of which provides a small form factor permitting placement in multiple locations on a vehicle to provide 360 degree sensing coverage for near range objects such as infrastructure, vehicles, bicycles and pedestrians. The RF sensor system of the present invention supports functions such as parking aid, currently utilizing ultrasonic sensors, while addressing technical shortcomings of ultrasonic systems such as range, response time, short range detection, limited field of view, ability to accurately detect profiles of objects of interest, and the like. The RF sensors of the system of the present invention utilize CMOS technology to achieve a high degree of integrated electronics onto a single System on Chip (SoC) embodiment for all analog and digital elements of the design. The SoC may be utilized on an antenna printed circuit board (PCB) or printed wiring board (PWB) to permit either single transmitting and receiving antenna configurations or multiple transmitting and receiving antenna configurations for improved angular resolution and object discrimination. The system may operate, for example, at about 79 GHz. By utilizing pseudo coding techniques, multiple sensors may simultaneously transmit and receive signals. These signals may be received by any of the sensors on the vehicle, permitting long baseline interferometry for high positional accuracy.

Within the SoC sensors of the present invention, all analog RF functions and all digital processing of the radar reflections are processed. This includes RF generation, analog to digital conversion, radar data cube processing elements up to and including object lists. The sensors may be connected to a central ECU, such as via Ethernet or similar high bandwidth (high data rate) connection or communication link, so that the range, Doppler information and micro-Doppler information collected by individual sensors may be combined to provide an enhanced image or environmental map of the vehicle's surroundings.

The SoC sensors of the present invention may include all analog RF functions and partial digital processing of the radar reflections. Radar data cube processing elements may be partially completed at the sensor, with lower level data further processed within a central ECU such that an enhanced image or environmental map of the vehicle's surroundings.

Figure 7:
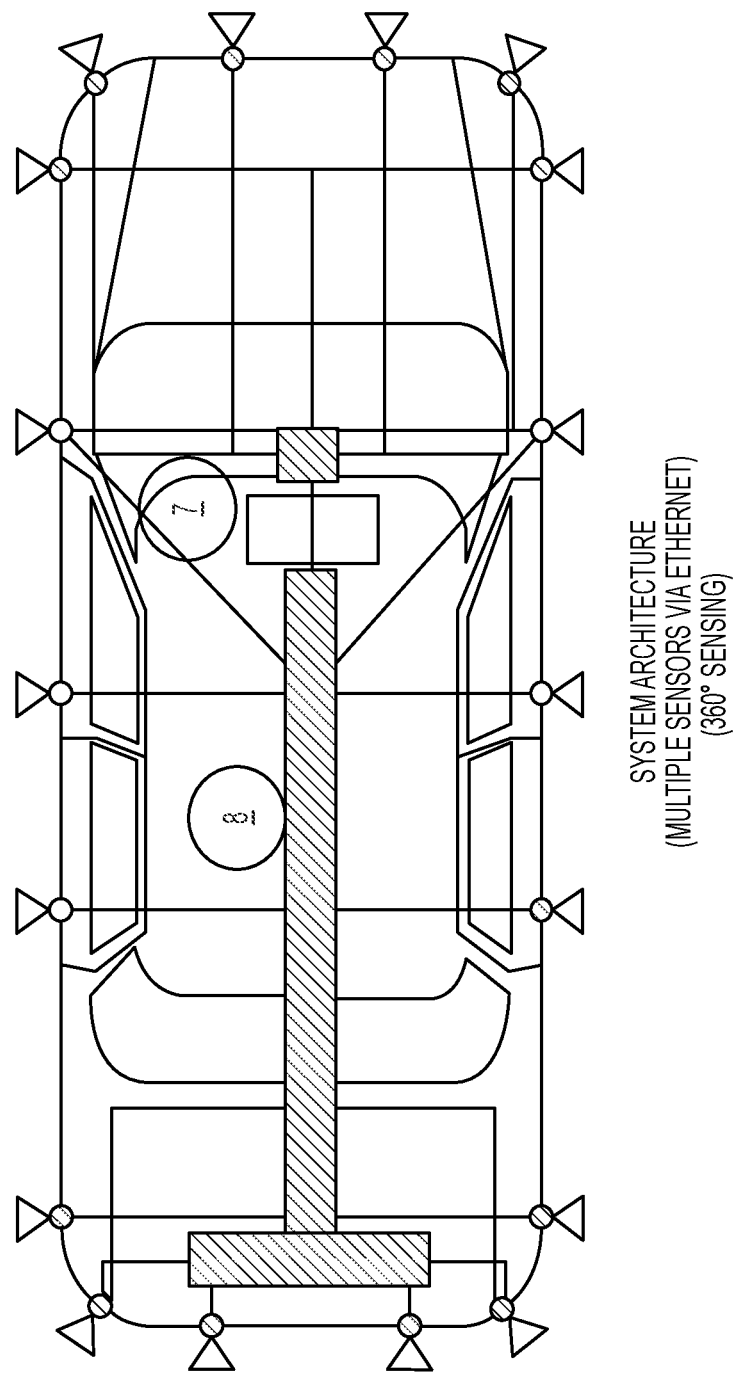
FIG. 7 is a plan view of a vehicle having the sensing system of the present invention, showing the system architecture with multiple sensors connected via a communication bus network (for example, DSI3, CAN, Ethernet)

As shown in FIG. 7, a central ECU 7 may support vehicle level features derived from the aggregated information provided by individual sensors to provide the driver of the vehicle with safety and convenience features such as parking aid, automated parking, home zone parking, valet parking, pedestrian detection, blind spot detection, lane change and merging aids, low speed automatic emergency braking (stop and go support), cross traffic alert and intersection collision prevention. The sensors communicate captured data to the control via a communication link 8, such as an Ethernet communication or wireless communication or other communication link to support the high data volume communicated by the sensors.

Figure 8:
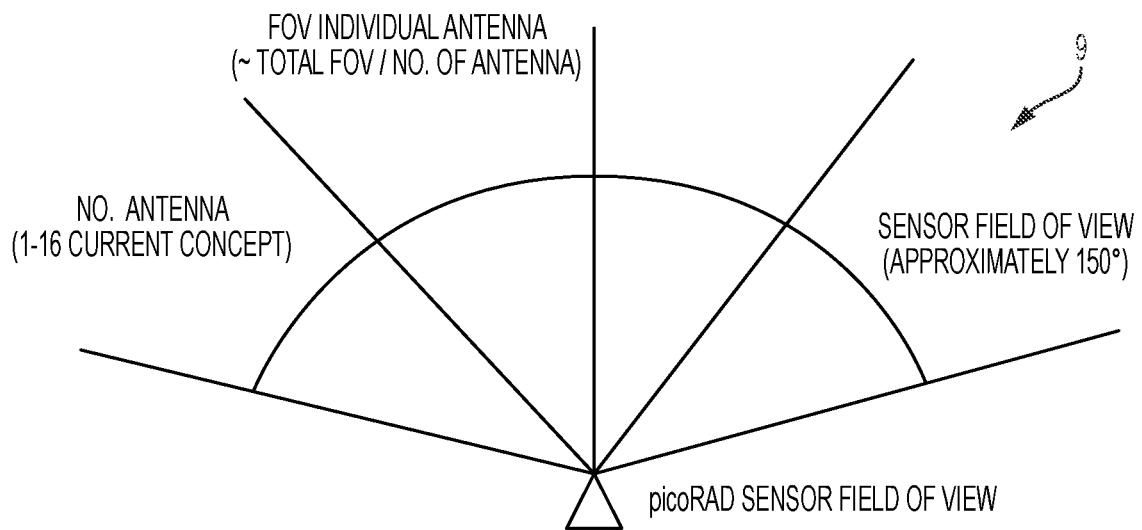
FIG. 8 is a schematic showing a multiple antenna sensor for use in the sensing system of the present invention.

Each sensor has a field of view (FOV) or field of sensing, determined by the specific antenna design. In one application of the system of the present invention, the antenna field of view 9 (FIG. 8) may be approximately 150 degrees. Accordingly, the FOV required or desired for any specific antenna beam would be approximately the total desired or required FOV divided by the number of antenna. In the application envisioned, the sensor may have up to sixteen virtual antennas. During operation, the number of antenna utilized may be controlled based on the complexity of the environment, where in a simple situation with a totally clear field of view only a single transmitting or receiving antenna may be used. Where complexity of the environment increases, the number of antenna utilized by a sensor may be increased via control from the ECU. This would increase the sensors' total cycle time, while providing a data rich environmental mapping of a complex scenario. Dependent on the degree of clutter and complexity (which may be determined by the control, responsive to processing of data captured by the RF sensors or responsive to processing of image data captured by one or more cameras of the vehicle or the like), the system could support greater or reduced autonomous vehicle operation.

Figure 9:
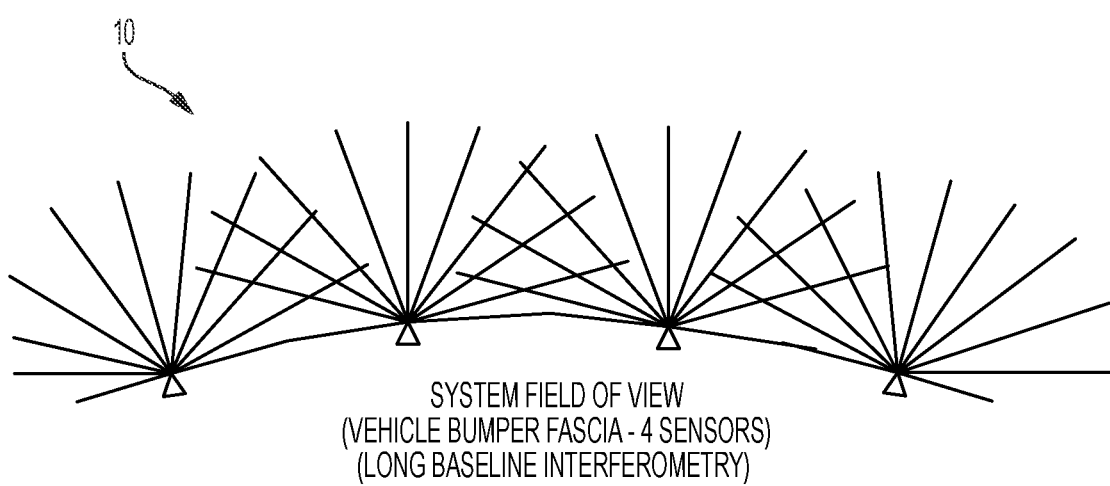
FIG. 9 is a schematic showing multiple sensors with a long baseline Interferometry based on multiple sensors' interlaced fields of view.

Multiple sensors may be placed at the vehicle to provide complete coverage around the vehicle (see FIGS. 7 and 9). Due to the wider field of view and the ability for radar to detect objects in closer proximity to the bumper fascia, the coverage provided by multiple sensors of the present invention would be greatly improved in close proximity to the vehicle. Through the use of long baseline interferometry and interlacing fields of view (see 10 in FIG. 9), increased object positional accuracy may be realized and point cloud mapping may be used to provide a precise classification of the situation and surrounding objects at or near the vehicle or otherwise in the field of sensing of one or more of the sensors.

As shown in FIG. 10, included in the sensor is a radar System on Chip (SoC) package 11 estimated to use 5 mm×5 mm eWLB (embedded wafer level ball grid array) technology. As shown in FIG. 11, within the SoC may be the functional blocks RF transmitting (Tx)/receiving (Rx) antennae 12, data processing 13, communication 14, with power management 15 at the SoC package (FIG. 10). The SoC may comprise an assembly using standard surface mount techniques onto an RF antenna board or PWB 18 (FIG. 12). In the illustrated embodiment, four transmitting (Tx) antennae 16 and four receiving (Rx) antennae 17 are envisioned, providing sixteen virtual antenna (with each transmitting antenna transmitting RF signals and each receiving antenna receiving RF signals transmitted by each transmitting antenna to provide a respective field of sensing of the RF sensor unit), for approximately a nine degree FOV for each antenna. It is estimated that the sensor configuration may provide pedestrian detection at over 20 m range and vehicles at over 40 m range.

As shown in FIG. 13, the sensor system is packaged in a molded housing 20, complete with a connector body and using compliant pin technology to eliminate soldering of the antenna board 18 to the housing 20. The sensor is sealed, using a radome 19 to enclose the electronics, with either ultrasonic or laser welding used to create a hermetic seal.

Therefore, the present invention provides a RF sensing system for a vehicle that utilizes a plurality of RF sensors disposed or arranged at the vehicle to provide a 360 degree field of sensing around the vehicle. The present invention provides a System on Chip that provides full RF function, digital signal processing, power management and communication. A single board antenna assembly is capable of providing multiple antenna transmit and receive paths for increased positional accuracy. The sensing system of the present invention provides a RF sensor that is similar in size to existing ultrasonic sensing system currently in use for automotive detection, and that is capable of detecting objects in close proximity to the vehicle or other application.

The RF sensor of the sensing system of the present invention is capable of being located behind RF transmissive material. Thus, the sensing system of the present invention is operable to provide short range function ADAS functions without sensing components visible on the external surfaces of the vehicle. For example, an RF sensor, capable of short range detection operating as a single transmitting and a single receiving device, can be located behind a vehicle fascia.

The RF sensor is capable of operation in either a single transmitting (Tx) and/or receiving (Rx) mode of operation or multiple transmitting (Tx) and/or receiving (Rx) modes of operation. The RF sensor is capable of detecting multiple objects within the same range, within its field of view. The RF sensor is capable of detecting standardized parking objects (such as a 75 mm diameter pipe) within a minimum 7+m range. The RF sensor is capable of detecting objects closer than about 7.5 cm from the vehicle fascia or vehicle body. The RF sensor may be sized to support implementation in bumper fascias, door handles, rocker panels, wheel flares, and the like at or around the subject vehicle.

The sensing system of the present invention thus comprises a system deploying one or more RF based sensors to provide 360 degree coverage around a vehicle, located as discussed above, and connected using a high bandwidth communication protocol or proprietary network communication protocol. The sensing system supports either sequential transmission or simultaneous transmission of all sensors or groups of sensors providing coverage around the vehicle. The sensing system deploys one or more RF based sensors to provide short range detection for functions such as parking assist, automated parking, blind spot detection, lane change and merge aid, automatic emergency braking, pedestrian detection, and/or the like.

The sensing system of the present invention may utilize aspects of the systems described in U.S. Pat. Nos. 8,027,029; 8,013,780; 6,825,455; 7,053,357; 7,408,627; 7,405,812; 7,379,163; 7,379,100; 7,375,803; 7,352,454; 7,340,077; 7,321,111; 7,310,431; 7,283,213; 7,212,663; 7,203,356; 7,176,438; 7,157,685; 6,919,549; 6,906,793; 6,876,775; 6,710,770; 6,690,354; 6,678,039; 6,674,895; 6,587,186 and/or 5,949,331 and/or International Publication No. WO 2011/090484 and/or U.S. Publication No. US-2010-0245066 and/or U.S. patent applications, Ser. No. 15/446,220, filed Mar. 1, 2017, and/or Ser. No. 15/420,238, filed Jan. 31, 2017, and/or U.S. provisional applications, Ser. No. 62/375,161, filed Aug. 15, 2016, Ser. No. 62/361,586, filed Jul. 13, 2016, Ser. No. 62/359,913, filed Jul. 8, 2016, Ser. No. 62/349,874, filed Jun. 14, 2016, Ser. No. 62/330,557, filed May 2, 2016, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A sensing system for a vehicle, said sensing system comprising:

a plurality of radio frequency (RF) sensor units disposed at the vehicle so as to have respective fields of sensing exterior of the vehicle;

wherein the fields of view of said plurality of RF sensor units combine to provide 360 degree coverage around the vehicle;

wherein each of said RF sensor units has multiple input multiple output (MIMO) operation;

wherein each of said RF sensor units comprises a radar system on chip device comprising a plurality of transmitting antennae and a plurality of receiving antennae, with each transmitting antenna transmitting RF signals and each receiving antenna receiving RF signals;

wherein said system on chip device of each of said RF sensor units comprises an analog to digital converter, a data processor and a communication device;

wherein said data processor of each of said RF sensor units processes data provided from the receiving antennae of the respective RF sensor unit and generates an output for the respective RF sensor unit;

a control, wherein outputs of said RF sensor units are communicated to said control by the communication device of the respective RF sensor unit, and wherein said control, responsive to received outputs of said RF sensor units, determines the presence of one or more objects exterior the vehicle and within the field of sensing of at least one of said RF sensor units; and wherein said plurality of RF sensor units (i) has at least a 20 m range for detection of pedestrians present exterior of the vehicle and (ii) has at least a 40 m range for detection of other vehicles present exterior of the vehicle.

2. The sensing system of claim 1, wherein said sensing system provides object detection for a parking assist system of the vehicle, and wherein said control, responsive to processing by said data processor of received outputs of said RF sensor units, is operable to determine presence of one or more objects closer than 7.5 cm from the vehicle.

3. The sensing system of claim 1, wherein the outputs of said RF sensor units are communicated to said control via Ethernet.

4. The sensing system of claim 1, wherein, during operation, the number of transmitting and receiving antenna utilized by said RF sensor unit is adjustable based on the complexity of the environment surrounding the vehicle.

5. The sensing system of claim 4, wherein, when the vehicle is at a relatively simple situation with a totally clear field of view, only one transmitting antenna and one receiving antenna is used by an individual one of said RF sensor units.

6. The sensing system of claim 5, wherein, as the complexity of the environment increases from the relatively simple situation, the number of transmitting antenna and receiving antenna utilized by the individual one of said RF sensor units is increased.

7. The sensing system of claim 4, wherein said control adjusts the number of transmitting and receiving antenna utilized by said RF sensor unit responsive to a determination of the complexity of the environment surrounding the vehicle.

8. The sensing system of claim 1, wherein said RF sensor unit comprises a unitary module that is configured to be disposed behind a vehicle component.

9. The sensing system of claim 8, wherein the vehicle component comprises one of a front bumper of the vehicle, a front grill of the vehicle, a rear bumper of the vehicle, a side panel of the vehicle, and a housing of an exterior mirror of the vehicle.

10. A sensing system for a vehicle, said sensing system comprising:

a plurality of radio frequency (RF) sensor units disposed at the vehicle so as to have respective fields of sensing exterior of the vehicle;

wherein the fields of view of said plurality of RF sensor units combine to provide 360 degree coverage around the vehicle;

wherein each of said RF sensor units has multiple input multiple output (MIMO) operation;

wherein each of said RF sensor units comprises a radar system on chip device comprising a plurality of transmitting antennae and a plurality of receiving antennae, with each transmitting antenna transmitting RF signals and each receiving antenna receiving RF signals;

wherein said system on chip device of each of said RF sensor units comprises an analog to digital converter, a data processor and a communication device;

wherein said data processor of each of said RF sensor units processes data provided from the receiving antennae of the respective RF sensor unit and generates an output for the respective RF sensor unit;

a control, wherein outputs of said RF sensor units are communicated to said control by the communication device of the respective RF sensor unit, and wherein said control, responsive to received outputs of said RF sensor units, determines the presence of one or more objects exterior the vehicle and within the field of sensing of at least one of said RF sensor units;

wherein said plurality of RF sensor units (i) has at least a 20 m range for detection of pedestrians present exterior of the vehicle and (ii) has at least a 40 m range for detection of other vehicles present exterior of the vehicle;

wherein, during operation, the number of transmitting and receiving antenna utilized by said RF sensor unit is adjustable based on the complexity of the environment surrounding the vehicle;

wherein, when the vehicle is at a relatively simple situation with a totally clear field of view, only one transmitting antenna and one receiving antenna is used by an individual one of said RF sensor units; and wherein said control adjusts the number of transmitting and receiving antenna utilized by said RF sensor unit responsive to a determination of the complexity of the environment surrounding the vehicle.

11. The sensing system of claim 10, wherein said sensing system provides object detection for a parking assist system of the vehicle, and wherein said control, responsive to processing by said data processor of received outputs of said RF sensor units, is operable to determine presence of one or more objects closer than 7.5 cm from the vehicle.

12. The sensing system of claim 10, wherein the outputs of said RF sensor units are communicated to said control via Ethernet.

13. The sensing system of claim 10, wherein, as the complexity of the environment increases from the relatively simple situation, the number of transmitting antenna and receiving antenna utilized by the individual one of said RF sensor units is increased.

14. The sensing system of claim 10, wherein said RF sensor unit comprises a unitary module that is configured to be disposed behind a vehicle component.

15. The sensing system of claim 14, wherein the vehicle component comprises one of a front bumper of the vehicle, a front grill of the vehicle, a rear bumper of the vehicle, a side panel of the vehicle, and a housing of an exterior mirror of the vehicle.

16. A sensing system for a vehicle, said sensing system comprising:

a plurality of radio frequency (RF) sensor units disposed at the vehicle so as to have respective fields of sensing exterior of the vehicle;

wherein the fields of view of said plurality of RF sensor units combine to provide 360 degree coverage around the vehicle;

wherein each of said RF sensor units has multiple input multiple output (MIMO) operation;

wherein each of said RF sensor units comprises a unitary module that is configured to be disposed behind a vehicle component, and wherein the vehicle component comprises one of a front bumper of the vehicle, a front grill of the vehicle, a rear bumper of the vehicle, a side panel of the vehicle, and a housing of an exterior mirror of the vehicle;

wherein each of said RF sensor units comprises a radar system on chip device comprising a plurality of transmitting antennae and a plurality of receiving antennae, with each transmitting antenna transmitting RF signals and each receiving antenna receiving RF signals;

wherein said system on chip device of each of said RF sensor units comprises an analog to digital converter, a data processor and a communication device;

wherein said data processor of each of said RF sensor units processes data provided from the receiving antennae of the respective RF sensor unit and generates an output for the respective RF sensor unit;

a control, wherein outputs of said RF sensor units are communicated to said control by the communication device of the respective RF sensor unit, and wherein said control, responsive to received outputs of said RF sensor units, determines the presence of one or more objects exterior the vehicle and within the field of sensing of at least one of said RF sensor units; and wherein said plurality of RF sensor units (i) has at least a 20 m range for detection of pedestrians present exterior of the vehicle and (ii) has at least a 40 m range for detection of other vehicles present exterior of the vehicle.

17. The sensing system of claim 16, wherein the outputs of said RF sensor units are communicated to said control via Ethernet.

18. The sensing system of claim 16, wherein, during operation, the number of transmitting and receiving antenna utilized by said RF sensor unit is adjustable based on the complexity of the environment surrounding the vehicle.

19. The sensing system of claim 18, wherein, when the vehicle is at a relatively simple situation with a totally clear field of view, only one transmitting antenna and one receiving antenna is used by an individual one of said RF sensor units, and wherein, as the complexity of the environment increases from the relatively simple situation, the number of transmitting antenna and receiving antenna utilized by the individual one of said RF sensor units is increased.

20. The sensing system of claim 19, wherein said control adjusts the number of transmitting and receiving antenna utilized by said RF sensor unit responsive to a determination of the complexity of the environment surrounding the vehicle.

* * * * *